United States Patent [19]
Lechner

[11] Patent Number: 5,375,903
[45] Date of Patent: Dec. 27, 1994

[54] DEVICE FOR REDUCING THE AERODYNAMIC RESISTANCE OF A COMMERCIAL VEHICLE

[76] Inventor: Anton Lechner, Eichenweg 6, D-8043 Unterfohring, Germany

[21] Appl. No.: 975,944
[22] PCT Filed: Jul. 2, 1991
[86] PCT No.: PCT/DE91/00547
§ 371 Date: Sep. 29, 1993
§ 102(e) Date: Sep. 29, 1993
[87] PCT Pub. No.: WO92/00870
PCT Pub. Date: Jan. 23, 1992

[30] Foreign Application Priority Data

Jul. 4, 1990 [DE] Germany ............... 4021337

[51] Int. Cl.$^5$ ............................................. B62D 35/00
[52] U.S. Cl. ............................ 296/180.1; 296/180.5
[58] Field of Search ............... 296/180.1, 180.2, 180.3, 296/180.4, 180.5, 37.6, 91; 105/1.1, 1.3

[56] References Cited

U.S. PATENT DOCUMENTS

| | | |
|---|---|---|
| 2,737,411 | 3/1956 | Potter . |
| 4,142,755 | 3/1979 | Keedy . |
| 4,214,787 | 7/1980 | Chain . |
| 4,601,508 | 7/1986 | Kerian ............... 296/180.4 |
| 4,682,808 | 7/1987 | Bilanin . |
| 4,688,841 | 8/1987 | Moore ............... 296/180.4 |
| 4,702,509 | 10/1987 | Elliott, Sr. ............... 296/180.4 |
| 4,738,203 | 4/1988 | Gielow et al. ............... 296/180.4 X |
| 4,741,569 | 5/1988 | Sutphen ............... 296/180.4 |
| 4,978,162 | 12/1990 | Labbé ............... 296/180.4 X |
| 5,058,945 | 10/1991 | Elliott, Sr. et al. ............... 296/180.5 |

FOREIGN PATENT DOCUMENTS

| | | |
|---|---|---|
| 1079772 | 6/1980 | Canada ............... 296/180.4 |
| 2623155 | 5/1989 | France ............... 296/180.5 |
| 2922130 | 12/1980 | Germany . |
| 3115742 | 11/1982 | Germany . |

OTHER PUBLICATIONS

Lanser et al, "Dynamic Performance of a Drag Reduction Device on a Full-Scale Tractor/Trailer", SAE Paper No. 912125, Aerospace Tech. Conf. and Expo., Sep., 1991.

Primary Examiner—Dean J. Kramer
Attorney, Agent, or Firm—Nixon & Vanderhye

[57] ABSTRACT

A device for reducing the aerodynamic resistance of a moving commercial vehicle includes an inflatable air bladder element which carries at least one rigid spoiler element. The inflatable air bladder element is in a deflated condition when the vehicle is at rest, and is brought into an inflated condition by dynamic pressure of air flow in response to forward vehicle movement. The spoiler element is deployed in response to the inflatable air bladder element assuming its inflated condition so that it moves from a position substantially parallel to the rear end of the vehicle, to a deployed position in which it extends angularly with respect to the vehicle. In such a manner, the spoiler element improves the dimensional stability of the device.

20 Claims, 2 Drawing Sheets

DEVICE FOR REDUCING THE AERODYNAMIC RESISTANCE OF A COMMERCIAL VEHICLE

BACKGROUND AND SUMMARY OF THE INVENTION

The aerodynamic resistance of commercial vehicles may be reduced using devices which include tarpaulins having an air intake in the rear area (see, for example, DE-OS 31 15 742 and U.S. Pat. No. 2,737,411). Such tarpaulins consist of basically airtight material and can be inflated by the dynamic pressure which develops during driving of the commercial vehicle. These tarpaulins are attached to the side edges of the vehicle's rear part and can be substantially tightened against the stationary vehicle (i.e., in the uninflated state) by interior restoring springs or backhaul cables. The drawback of such air-inflatable tarpaulins is the fact, that an aerodynamically optimal effective exterior contour cannot practically be produced since the flexible air-inflatable tarpaulin following the action of the inside and outside pressure, inflates to a shape that cannot exactly be determined. Also, the tarpaulin is relatively heavy and unwieldy and aesthetically unsightly in its folded state of rest.

Designs are also known (see U.S. Pat. No. 4,142,755) in which, on the rear part of a commercial vehicle, dimensionally stable frame parts and molded parts are used to counteract the problem of the fluctuating air conduction by the inflated air tarpaulin. Such designs are extremely expensive, and moreover, lengthen the vehicle structure. Also, it is possible only with high expenditure of labor to load or unload a commercial vehicle with such devices from the back side. As such, these conventional devices are not acceptable.

With this background, an object of the present invention is configuring a device with structurally simple means so that a profile favoring the path of air flow can be provided during travel without using aggregates of the vehicle in the vehicle's rear area and which is dimensionally stable in itself so as to constantly reduce the aerodynamic resistance of the vehicle. In the state of rest of the vehicle, the rear area is to be basically unaffected, i.e., the loading possibilities are not to be impaired and the structure is to be optimized with respect to weight. Furthermore, it is especially required that with surface mountings for tarpaulins, the rear tarpaulin can be folded upward in a normal way to unload the vehicle.

The device of this invention achieves the above-stated object by means of a rear tarpaulin which serves as a component of an inflatable air bladder leaving rigid spoiler elements (e.g., rigid polyurethane foam or similar light-weight materials). The device of the present invention is thus dimensionally stable since the spoiler elements are spreadable, i.e. angularly adjustable, by integration in the tarpaulin material of the air bladder or by direct attachment thereto, depending on the extent of the inflation of the air bladder. Thus, an optimal path of air flow is achieved in the area behind the contour edges at the rear of the vehicle, by virtue the dimensionally stable spoiler elements, it is assured that the overall profile at the rear of the vehicle during driving undergoes no shape changes whatsoever which could adversely affect the path of air flow. In the state of rest of the vehicle, i.e., with uninflated air bladder, the parts being used for shaping occupy only minimal space. In this regard, the spoiler elements as a component of the rear tarpaulin extend parallel to the rear of the vehicle and contribute only to a very slight increase of the total vehicle length. The rear tarpaulin forming the air bladder and carrying the spoiler elements is able to be handles normally with only slightly increased weight when the vehicle is loaded or unloaded on the back side. In this case, the rear tarpaulin can be folded upward as is conventional. The spoiler elements despite their dimensional stability are no obstacle to this type of handling of the rear tarpaulin since they are segmented.

The device for reducing the aerodynamic resistance according to this invention can also be used in an especially advantageous way in the gap between a truck tractor and a trailer for attaching to the rear part of the truck tractor since the spoiler elements may be provided with length-adjustable cables. The spoiler elements are thus adjustable in any angular position and provide for an optimal path air flow to be achieved in the gap between the truck tractor and trailer vehicle.

The idea inherent in the invention of the angular positioning of dimensionally stable spoiler elements by an inflatable air bladder can also be used in commercial vehicles with solid surface mountings. For example, the rear doors of a commercial vehicle can each be provided with an air bladder carrying spoiler elements and a separate air intake per air bladder is provided on the top side of the vehicle or on its side.

Advantageous embodiments and further aspects of this invention will be described in greater detail below.

BRIEF DESCRIPTION OF THE DRAWINGS

The invention is explained below based on the embodiments with reference to the attached drawings, wherein.

DETAILED DESCRIPTION OF THE PREFERRED EXEMPLARY EMBODIMENTS

Figure 1:
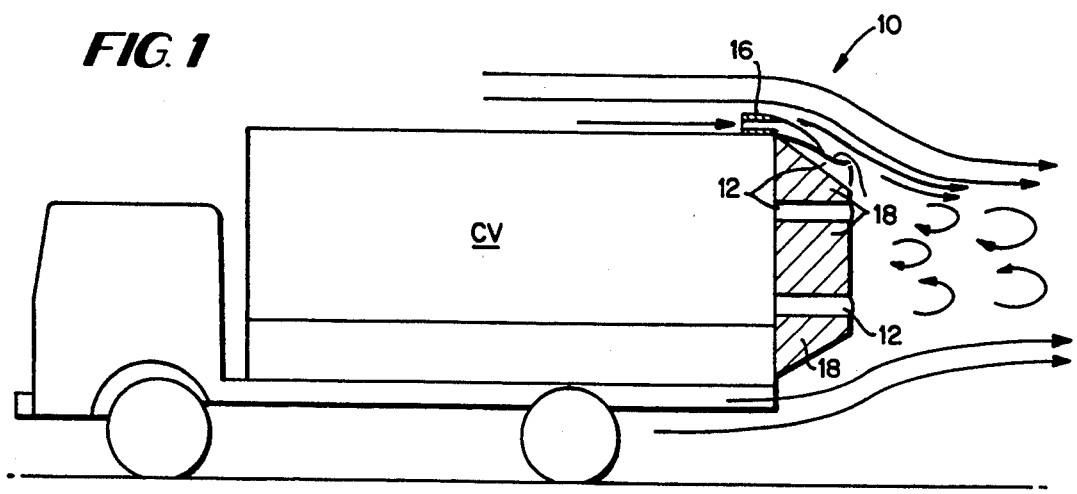
FIG. 1 is a diagrammatic lateral view of a commercial vehicle being driven without a trailer, with a representation of a device according to this invention positioned at the vehicle's rear for reducing the vehicle's aerodynamic resistance.

In FIG. 1 of the drawing, a commercial vehicle CV without a trailer is represented, which includes on its rear part a device 10 according to the present invention for reducing the vehicle's aerodynamic resistance. As a component of the device 10, a rear tarpaulin 12 is used which serves to seal the vehicle cross-section at its rear and consists, for example, of reinforced cloth material, a plastic web, or the like. Rear tarpaulins of this type are generally detached from their lateral connections and turned upward to unload the vehicle at the rear. This applies in the same way to rear tarpaulin 12 as a component of the device 10 according to the present invention. In this regard, rear tarpaulin 12 is designed as a double-walled structure on the edges of the vehicle body so that a three-sided, U-shaped closed air bladder 14 is formed. Air bladder 14 is connected to a single-layer center part 15. The rear tarpaulin 12 can be produced, for example, from a tarpaulin part corresponding to the contours of air bladder 14 being sewed onto a single-layer rear tarpaulin. The air bladder 14 made in this way is connected by a flexible tube connection to an air intake 16 assembled, for example, on the top side of the commercial vehicle. An air intake 16 of a conventional type use for inflatable, flexible covers can be used. With the vehicle in travel, air (see FIGS. 1 and 2) enters air intake 16 and fills the entire volume of air bladder 14. Air is inflated by the dynamic pressure, while center part 15 of rear tarpaulin 12 maintains the plane configuration.

Figure 2:
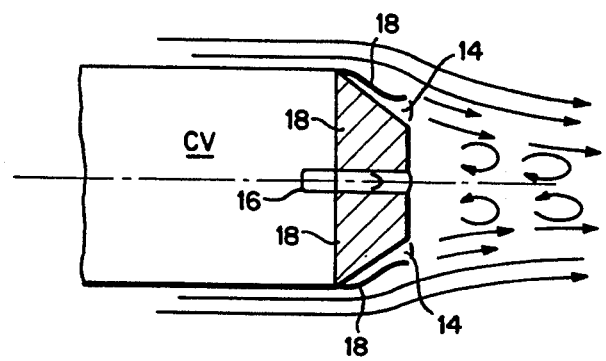
FIG. 2 is a top view of the rear part of the commercial vehicle depicted in FIG. 1.
Figure 5:
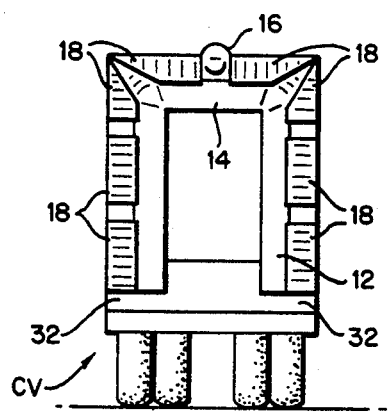
FIG. 5 is a rear view of the commercial vehicle according to FIG. 1 showing the air bladder and spoiler elements carried by the air bladder.

According to the invention, spoiler elements 18 (e.g., formed of rigid polyurethane foam), are integrated into the rear tarpaulin 12 in the area of air bladder 14. According to FIG. 3, spoiler elements 18 are attached to the lateral and top sides of the vehicle in the area of air bladder 14 on the latter or may be integrated with the air bladder's material. In principle, in the framework of the idea inherent in the present invention, it is also possible to attach the spoiler elements 18 detachably to the outside skin of air bladder 14. Furthermore, spoiler elements 18 of varied length and width dimensions can be provided to take into account the different conditions of the vehicle. In each case, the spoiler elements 18 are dimensionally stable, i.e., plate-shaped elements, which are adjusted angularly outward when the air bladder 14 is inflated and as a result provide the path of air flow at the rear of the vehicle CV as seen in FIGS. 1 and 2. In the embodiments represented as examples in FIGS. 1 and 5, a total of eight spoiler elements 18 are provided which are spread outwardly by the air bladder 14 when the latter is filled with air. This structure of the individual spoiler elements 18 as such is stable when the vehicle is driven since the spoiler elements 18 are formed of dimensionally stable materials. The spoiler elements 18 favoring the flow at the rear of the vehicle CV thus is not subject to any lateral pivoting movements, as is the case with conventional tarpaulin designs. The values of the reduction of aerodynamic resistance consequently remain basically constant.

Figure 4:
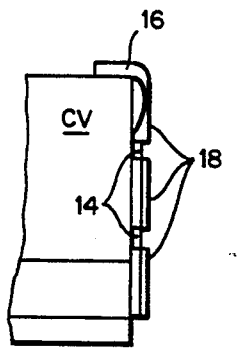
FIG. 4 is a partial view of the rear of the vehicle showing the air bladder spoiler elements in a state of rest.

When the vehicle is stopped, the air bladder 14 is emptied for lack of dynamic pressure, and spoiler elements 18 return to their original relative position extending basically parallel to the rear of the vehicle CV (see FIG. 4). At a standstill, the actual vehicle length accordingly is increased only slightly.

Figure 3:
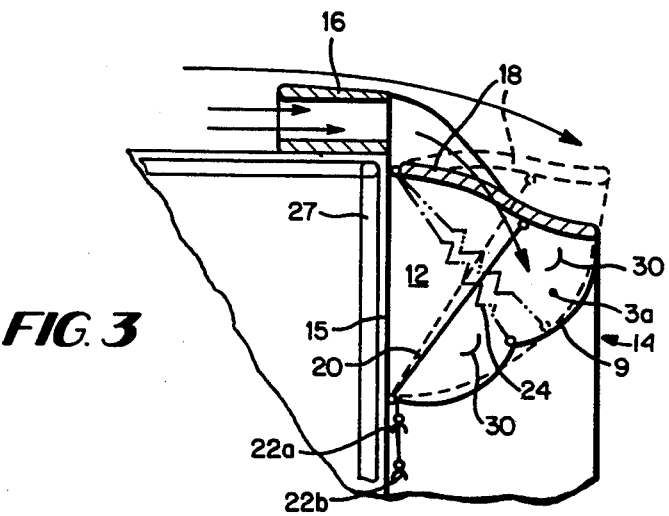
FIG. 3 is an enlarged individual sectional view of the air intake and a part of the air bladder carrying a spoiler element, the spoiler element being represented in two angular positions.

In FIG. 3 of the drawing, means are represented which make it possible to adjust spoiler elements 18 with respect to their angle of incidence to a moving vehicle so that, the flow requirements at different vehicle speeds or in different installation positions can be taken into account. One of several cables 20 is represented in FIG. 3 inside air bladder 14 and is connected with one of the spoiler elements 18 and can be attached to the underside, i.e., outside the air hose on hooks 22a, 22b. By providing different lengths of cable 20 (i.e., by connecting cable 20 to hook 22a or hook 22b), a different angle of incidence of the spoiler element 18 is achievable, as is represented in broken lines in FIG. 3. In the same way, it is possible, inside air bladder 14 to provide rubber cables 24, which, with inflation of the air bladder 14 are stretched and, with the vehicle coming to a standstill, contract the air bladder 14 so that it is basically covered below spoiler elements 18 attached to the outside. This contributes in an advantageous way to an arrangement that is completely flat, thus also not sagging downward, of the components of the device 10 for reducing the air resistance, as the partial view according to FIG. 4 shows. To get into the interior of the air bladder 14, the latter can exhibit a zipper 27 (FIG. 3) along its connecting seams to the center part 15. The zipper 27 can also be provided in any other position to perform if required, an exchange of cables 20 or of rubber cables 24.

Figure 6:
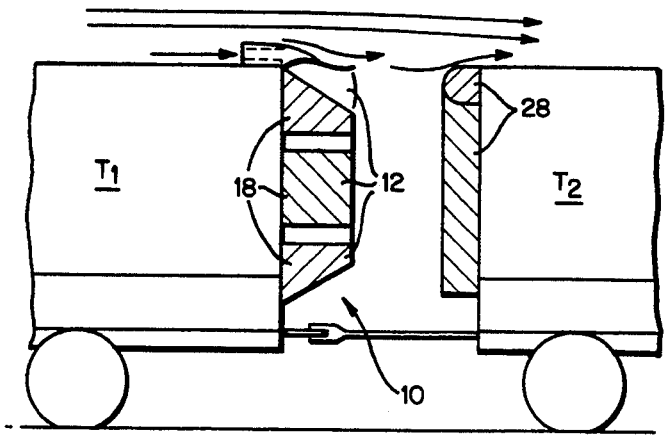
FIG. 6 is a lateral view of a truck tractor with trailer vehicle with use of a device placed on the rear part of the truck tractor to reduce its aerodynamic resistance.
Figure 7:
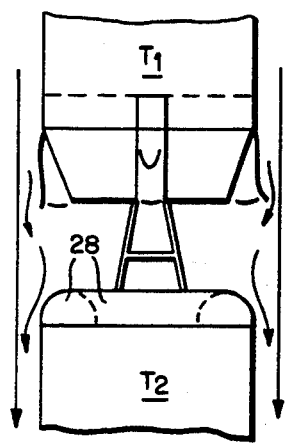
FIG. 7 is a view of the arrangement according to FIG. 6, but seen from above.

In FIGS. 6 and 7, the use of the device 10 according to the present for reducing the aerodynamic resistance in trailer operation is represented. The device 10 is placed at the rear of the truck tractor $T_1$, and with above-described cable 20, the angle of incidence of spoiler elements 18 is selected so that the flow is around the front edges of the trailer vehicle $T_2$ on the outside. The formation of air whirls between truck tractor $T_1$ and trailer vehicle $T_2$ is basically completely stopped as a result. In addition, the trailer vehicle $T_2$ can include along its front edges profile structures 28 formed of plastic and used for the path of flow. Preferably, a comparably designed device 10 for reducing the aerodynamic resistance is present at the rear of the trailer vehicle $T_2$.

The invention was explained above with reference to a basically leakproof air bladder 14, which is inflatable by the dynamic pressure in the vehicle while driving. To regulate the dynamic pressure, the air bladder 14 can also exhibit outlet opening 30 (see FIG. 3) in predetermined position that are also sealable. On the underside of air bladder 14, there are preferably drainage openings 32 (see FIG. 5) provided to allow drainage of water which can get into air bladder 14 through air intake 16 while driving in rain.

Although the invention was explained above with reference to an air bladder 14 as a component of a rear tarpaulin 12, it is also possible to provide spoiler elements 18, inflatable by an air bladder on the outside of the rear doors or rear flaps of a commercial vehicle. In this case, the air intake 16 is provided, e.g., respectively on the sides of the commercial vehicle and inflates by a hose connection the air bladder carrying the spoiler elements on the outside of the left or right rear door. In the same way as in the use on rear tarpaulins, the device for reducing the air resistance is also to be considered as space-saving i this use, i.e., at a standstill of the vehicle, the air bladder and the spoiler elements return to their retracted position, extending parallel to the rear of the vehicle, on the rear door. The loading and unloading of the vehicle is in no way impaired since the rear doors can usually be opened without the parts mounted on them being an obstacle.

In addition, the inventive idea that while driving and without using aggregates of the vehicle in the area of the rear, a profile favoring the path of flow can be provided, which is dimensionally stable in itself (while driving) and thus is constant and optimally effective in the reduction of the aerodynamic resistance, can also be achieved in that the rear spoiler can be made as a plate-shaped element, inflatable by the dynamic pressure, e.g., of tarpaulin material. During faster travel, when the aerodynamic resistance becomes effective, these dimensionally stable elements are formed with known means by reductions, such as, e.g., the procedures used in the air mattress production. The spoiler elements are connected with air intake 16.

I claim:

1. Device for reducing the aerodynamic resistance of a moving commercial vehicle comprising:

an inflatable air bladder element positioned at a rear end of the vehicle, said air bladder element being in a deflated condition when the vehicle is at rest, and being in an inflated condition by dynamic pressure of air flow in response to forward vehicle movement; and at least one rigid spoiler element carried by said air bladder element, said at least one spoiler element being deployed in response to said inflatable air bladder element assuming said inflated condition from (i) a rest position, wherein said at least one spoiler element extends substantially parallel to the rear end of the vehicle, into (ii) an operative position, wherein said at least one spoiler element extends at an angle outwardly from the rear end of the vehicle, whereby aerodynamic resistance of the vehicle during forward vehicle movement is reduced.

2. Device according to claim 1, wherein said air bladder element is a double-walled closed tarpaulin, and wherein said device further includes an air intake.

3. Device according to claim 2, wherein said double-walled closed tarpaulin includes a single-layer center part.

4. Device according to claim 1, wherein said at least one spoiler element is integral with said air bladder and is formed of a dimensionally stable material.

5. Device according to claim 1, wherein said at least one spoiler element is attached to an exterior surface of said air bladder.

6. Device according to claim 1, which further comprises an air intake for introducing air into said air bladder, and wherein said air intake is positioned on the commercial vehicle.

7. Device according to claim 1, which further comprises at least one restraining cable attached to said at least one spoiler element to adjust angular positioning of said at least one spoiler element relative to the commercial vehicle.

8. Device as in claim 7, which includes tie-down hooks to which said at least one restraining cable is tied to allow for length adjustment thereof.

9. Device according to claim 1, which further includes at least one resilient cable connected to said air bladder element for assisting in retracting said air bladder element into said deflated condition thereof.

10. Device as in claim 9, wherein said at least one resilient cable is formed of a rubber material.

11. Device according to claim 1, wherein said air bladder element includes drainage openings.

12. Device according to claim 1, wherein said air bladder element is attached to doors of the commercial vehicle.

13. Device according to claim 1, wherein the commercial vehicle includes a truck tractor trailer, and wherein said air bladder element is attached to a rear part of the truck tractor so as to be positioned in a gap between the truck tractor and trailer.

14. Device according to claim 1, wherein said air bladder is three-sided and positioned along side and top edges at the rear end of the commercial vehicle.

15. Device according to claim 1, wherein said at least one rigid spoiler element has a plate-shaped configuration.

16. Device as in claim 1, wherein said air bladder element carries a plurality of said rigid spoiler elements.

17. Device as in claim 1 or 4, wherein said at least one spoiler element is formed of a rigid polyurethane foam material.

18. Device as in claim 1, wherein said air bladder element includes outlet openings to allow air to pass therethrough when in said inflated condition.

19. Device as in claim 1, wherein said air bladder element includes a zippered access opening.

20. Device as in claim 1, wherein said air bladder element is generally U-shaped and carries a plurality of said rigid spoiler elements on each side thereof.

* * * * *